United States Patent
Grashey et al.

(10) Patent No.: US 7,289,957 B1
(45) Date of Patent: Oct. 30, 2007

(54) VERIFYING A SPEAKER USING RANDOM COMBINATIONS OF SPEAKER'S PREVIOUSLY-SUPPLIED SYLLABLE UNITS

(75) Inventors: Stephan Grashey, Olching (DE); Wolfgang Kuepper, Munich (DE)

(73) Assignee: Siemens Aktiengesellschaft, Munich (DE)

(*) Notice: Subject to any disclaimer, the term of this patent is extended or adjusted under 35 U.S.C. 154(b) by 709 days.

(21) Appl. No.: 10/111,774

(22) PCT Filed: Oct. 24, 2000

(86) PCT No.: PCT/DE00/03754

§ 371 (c)(1), (2), (4) Date: Apr. 29, 2002

(87) PCT Pub. No.: WO01/31637

PCT Pub. Date: May 3, 2001

(30) Foreign Application Priority Data

Oct. 28, 1999 (DE) ................................ 199 52 049

(51) Int. Cl.
*G10L 17/00* (2006.01)

(52) U.S. Cl. .......................... 704/249; 704/246

(58) Field of Classification Search ................ 704/254, 704/249, 251, 246
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 5,055,658 A | * | 10/1991 | Cockburn | 235/382 |
| 5,204,966 A | * | 4/1993 | Wittenberg et al. | 726/6 |
| 5,517,558 A | * | 5/1996 | Schalk | 704/251 |
| 5,548,647 A | * | 8/1996 | Naik et al. | 704/200 |
| 5,706,398 A | * | 1/1998 | Assefa et al. | 704/249 |
| 5,754,972 A | * | 5/1998 | Baker et al. | 704/200 |
| 5,809,462 A | * | 9/1998 | Nussbaum | 704/232 |
| 5,822,728 A | * | 10/1998 | Applebaum et al. | 704/254 |
| 5,873,061 A | * | 2/1999 | Hab-Umbach et al. | 704/254 |
| 6,076,055 A | * | 6/2000 | Bossemeyer et al. | 704/250 |

(Continued)

FOREIGN PATENT DOCUMENTS

DE 19907854 A1 9/1999

(Continued)

OTHER PUBLICATIONS

Matsui et al. Concatenated Phoneme Models For Text-Variable Speaker Recognition, 1993, IEEE International Conference on Acoustics, Speech, and Signal Processing, pp. II-391-II-394.*

(Continued)

*Primary Examiner*—Tālivaldis Ivars Šmits
*Assistant Examiner*—Thomas E. Shortledge
(74) *Attorney, Agent, or Firm*—Staas & Halsey LLP

(57) ABSTRACT

A method for verifying a speaker by a computer is specified in which the speaker utters at least one code word consisting of a random combination of syllable units previously supplied by the speaker. A comparison of this uttered code word with at least one pattern verifies the speaker if the at least one pattern matches the uttered code word with a predetermined minimum quality. The code word is designed in such a manner that it has at least two syllable units, at least one syllable unit being a component of a further code word.

29 Claims, 3 Drawing Sheets

U.S. PATENT DOCUMENTS

| | | | |
|---|---|---|---|
| 6,094,632 A * | 7/2000 | Hattori | 704/239 |
| 6,230,129 B1 * | 5/2001 | Morin et al. | 704/254 |
| 6,480,825 B1 * | 11/2002 | Sharma et al. | 704/270 |
| 6,490,561 B1 * | 12/2002 | Wilson et al. | 704/251 |
| 6,539,352 B1 * | 3/2003 | Sharma et al. | 704/249 |
| 6,556,127 B1 * | 4/2003 | Moser et al. | 340/5.84 |
| 6,940,976 B1 * | 9/2005 | Matyas et al. | 380/44 |

FOREIGN PATENT DOCUMENTS

| | | |
|---|---|---|
| EP | 0953972 A2 | 11/1999 |
| WO | WO94/00838 | 1/1994 |
| WO | WO95/08821 | 3/1995 |

OTHER PUBLICATIONS

Furui et al., "Phoneme-Level Voice Individuality Used in Speaker Recognition", ICSLP 94, Yokohama, Japan, pp. 1463-1466.

Sakoe et al., "Dynamic Programming Algorithm Optimization for Spoken Word Recognition", IEEE Transactions On Acoustics, Speech, And Signal Processing, vol. 26, 1(1978) pp. 43-49.

* cited by examiner

VERIFYING A SPEAKER USING RANDOM COMBINATIONS OF SPEAKER'S PREVIOUSLY-SUPPLIED SYLLABLE UNITS

This application is based on and hereby claims priority to PCT Application No. PCT/DE00/03754 filed on Oct. 24, 2000 and German Application No. 199 52 049.6 filed on Oct. 28, 1999, the contents of which are hereby incorporated by reference.

BACKGROUND OF THE INVENTION

The invention relates to a method and a system for verifying a speaker by a computer.

In a speaker verification, a speaker is to be identified or authenticated to a system, for example during an access check, by using his voice. In the verification, it is of particular importance to also ensure that the correct user is speaking and the characteristics of the speaker thus authenticate him to the system.

A device suitable for this purpose is known from DE 199 07 854 A1. In this document, it is also proposed that the speaker is only verified if the quality of the code word input is above a predetermined threshold of acceptance.

Problems are presented by the fact that for an unauthorized user (attacker) to outsmart the system (e.g. the access check), it may be sufficient to record the password input of the authorized user and to gain unauthorized access by replaying the recording. This attack is particularly simple when each speaker who authenticates himself to the system has his own password which is compared with patterns of the same password of the same speaker in the form of speech and access to the system is granted if the match is sufficiently good.

It is thus disadvantageous that a relatively simple attack of the unauthorized person can lead to success and thus contributes to a quite low acceptance of the verification of the speaker by his utterance.

In Furui S. et al. "Phoneme-Level Voice Individuality Used in Speaker Recognition", Yokohama, Japan, 1994, Yokohama: ASJ, pages 1463-1466, a method for verifying a speaker by a computer is specified in which phonemes are used, that is to say the smallest semantically distinguishable sound units. As a result, the possible vocabulary which a speaker is allowed to speak is not predetermined. On the other hand, using phonemes according to the method disclosed makes it mandatory to use relatively computationally complicated methods such as, for example, HMMs in order to model the speakers.

SUMMARY OF THE INVENTION

It is thus one possible object of the invention to specify a method for speaker verification in which an improvement is made such that less complex algorithms can be used and the training effort can be reduced, the method nevertheless being secure and gaining high acceptance from its users.

To achieve the object, a method for verifying a speaker by a computer is specified in which the speaker utters at least one code word. This uttered code word is compared with at least one pattern. The speaker is verified if the at least one pattern matches the uttered code word with a predetermined minimum quality, the code word being designed in such a manner that it has at least two syllable units, at least one syllable unit being a component of a further code word. The speaker is not otherwise verified. The said minimum quality can be advantageously aimed at a measure of the difference between the spoken code word and the at least one pattern.

Due to the new assembly of the syllable units of the code word, it is possible to offer, or require the speaker to verify, a multiplicity of code words, and the speaker does not need to have spoken all the code words, i.e. the combinations of the syllable units (e.g. in a training phase). It is also of advantage that the user does not need to remember any code word, the authentication being based on the peculiarity of his voice. The code word to be spoken is randomly assembled by the computer by the syllable units known to it and displayed to the user. The user only needs to say it aloud and the computer checks whether there is a sufficient difference with respect to the quality of the match with respect to at least one pattern. If this is the case, the user has successfully authenticated himself to the system.

Overall, it is ensured with high probability that, depending on the number of available syllable units, the code word frequently changes which effectively counters the attack, explained initially, of recording the voice of the authorized user.

A further development relates to the code word to be uttered being, in particular, displayed to the speaker. This has the advantage that the speaker sees which code word he has to utter and, in particular, does not need to remember the code word himself.

The speaker may only authenticated when he has uttered a number of code words in each case with sufficient minimum quality. Interrogation of a number of code words considerably reduces the risk of an accidental recognition or of an accidentally successful attack.

It is also a further development that each syllable unit comprises at least one number. Numbers have the characteristic, mentioned above, that they have in each case a separate meaning individually and in combination with other numbers. Thus, the syllable units formed of individual numbers can also be randomly mixed, resulting in new code words which do not previously have to have been spoken especially in the new composition.

The advantage is, in particular, that during a simple recognition or verification of a speaker by speaking a predetermined code word, there is only a comparison as to whether the speaker has said the code word within the extent of a predetermined tolerance to the pattern previously stored and also spoken by this speaker. If this is the case, the speaker is positively authenticated and otherwise he is rejected. The speaker himself always uses this code word and an attack, for example by a recording device, can thus be easily successful. In the method presented here, it is of advantage, in particular, that a multiplicity of code words are available to the speaker, each of which he does not previously have to have spoken (trained). The set of the code words selected, in particular, by random number generator, is thus greater by far than the set of words previously spoken by the speaker. This considerably increases the acceptance of the speaker who does not have to endure lengthy training procedures.

It should be noted here that the method described can also be used if no code word is displayed to the user. In such a case, the user must remember the code words which could be potentially queried.

As an alternative, he remembers a (logical) operation associated with the querying of code words. Thus, the connection specifies which (changing) code word is to be spoken at the time without displaying it itself. An example of this is the querying of date information. The code words change themselves in this case and the authorized user, who knows the manner in which he has to speak the date information (items), does not need any elaborate remembering processes either.

The method described above is first adapted to the respective speaker by a training method. During this process, the speaker speaks a number of words which are automatically segmented into syllable units. The syllable units themselves are stored.

In this system, the spoken syllable units form a basis for code words which can be requested from the speaker.

The code word for which the speaker may be tested is a pattern assembled from the segmented syllable units. In this system, two or else more syllable units can be suitably combined with one another.

It is also an embodiment that the segmenting into syllable units is effected by a DTW (Dynamic Time Warp) algorithm. A description of the DTW algorithm may be found, e.g. in Hiroaki Sakoe and Seibi Chiba: "Dynamic Programming Algorithm Optimization for Spoken Word Recognition". In: N. Rex Dixon and Thomas B. Martin, "Automatic Speech & Speaker Recognition", IEEE Press, New York, 1979. In this method, the beginning and the end of the syllable units are determined, in particular, by the loudness of the spoken voice signal. The duration of the spoken signal is normalized to a predetermined time axis (i.e. stretched or compressed) and it is decided by predetermined sounds in the statistical mean (for example by the mean value or of the median) where a (segment) boundary is located between the syllable units.

In this context, it is of advantage, in particular, that the segmenting is effected by a set of predetermined voice samples (references, reference model), possibly from different speakers, particularly male and female speakers. During the training for the peculiarity of the speaker to be recognized and to be authenticated, these predetermined voice samples (added to the system) are overwritten by the peculiar voice samples, that is to say patterns, of the speaker to be authenticated. The voice samples are advantageous for entering into the training for the peculiar way of speaking of the speaker to be authenticated. It is also of advantage that the voice samples come from different speakers so that especially the segmenting of the syllable units of the speaker can be efficiently performed by these predetermined voice samples.

The pattern may comprise, in particular, two-digit numbers. Furthermore, the numbers can be particularly advantageously within a range from 21 to 99. It is of advantage here that only a few numbers need to be trained by the speaker and far more numbers can be assembled by the system from syllable units to form code words which can be tested.

If the speaker to be authenticated speaks the numbers 31 and 27 in a training phase, these two numbers are segmented by the predetermined voice samples into:

"thirty", "one", "twenty", "seven".

Using these syllable units, it is also possible to test the numbers 37 and 21 without previous training. This permutation of the numbers and the associated syllable units makes it clear that a few speech samples of the speaker to be authenticated are sufficient for being able to start an interrogation for verification from a large number of possible code words.

To achieve the object, a system for verifying a speaker is also specified in which a processor unit is provided which is set up in such a manner that a) a code word uttered by a speaker can be detected;

b) the code word is designed in such a manner that it is formed of at least two syllable units, at least one syllable unit being a component of a further code word;

c) the uttered code word can be compared with at least one pattern;

d) the speaker is verified if the at least one pattern matches the uttered code word with a predetermined minimum quality;

e) in which the speaker is not otherwise verified.

The system is suitable, in particular, for carrying out the method according to aspects of the invention or one of its developments explained above.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
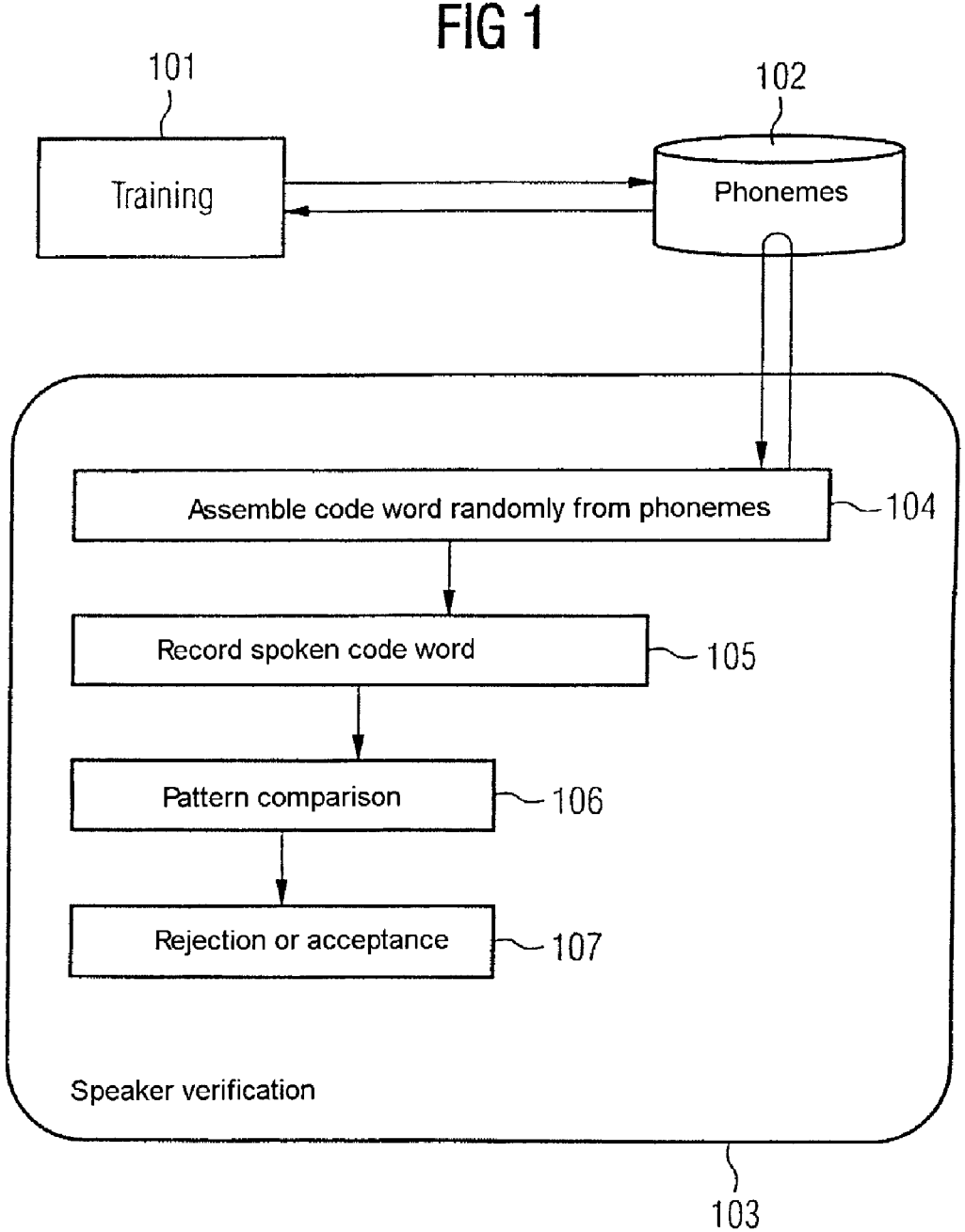
FIG. 1 shows a method for verifying a speaker with previous training.

Reference will now be made in detail to the preferred embodiments of the present invention, examples of which are illustrated in the accompanying drawings, wherein like reference numerals refer to like elements throughout.

FIG. 1 shows a drawing with steps of a method for verifying a speaker with previous training. In a training 101, syllable units 102, which are initially available in the form of predetermined voice samples, are adapted to the speaker to be verified (see FIG. 2 and associated description). The speaker verification 103 first randomly determines a code word from syllable units 102 (compare step 104). The code word is preferably displayed to the speaker to be verified whereupon he utters it, the spoken code word is recorded in a step 105 and compared in a step 106 with a pattern from the trained syllable units 102. If the difference between the uttered code word and the pattern is less than a predetermined threshold, the speaker is verified and if not, the speaker is not verified, the code word is rejected as originating from the speaker to be verified (see step 107).

Figure 2:
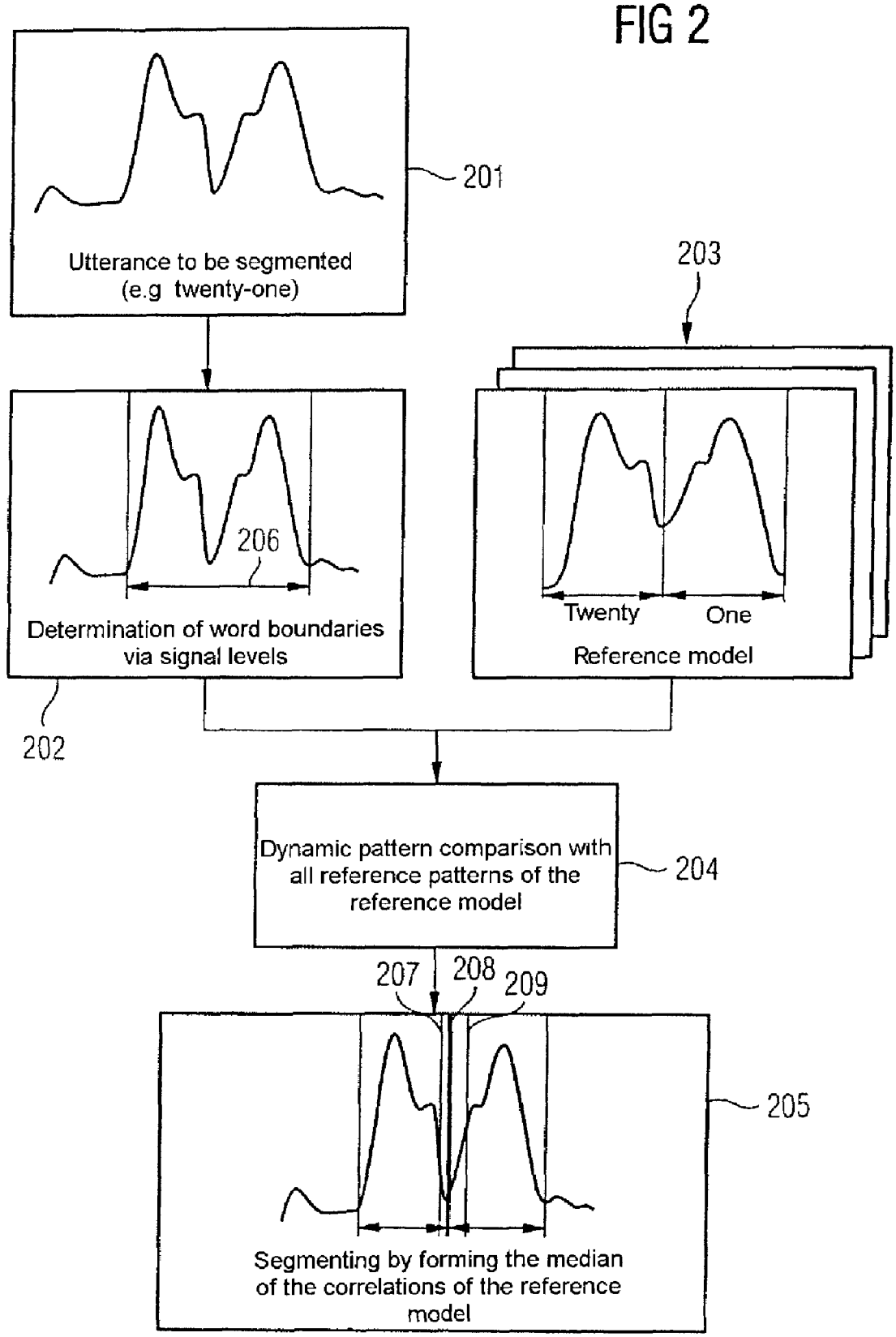
FIG. 2 shows steps of a method for the automatic segmentation of a voice signal.

FIG. 2 shows steps of a method for the automatic segmentation of a voice signal. In a block 201, a segmenting utterance "21" is shown as the variation of its energy versus time (signal level). Using a predetermined threshold for the signal level (signal/no signal distinction), the boundaries of the utterance to be segmented are determined in a step 202. This results in an area 206. Each voice sample (reference model) 203 represents the same utterance "21" spoken by different speakers, the respective course of the segment boundaries between the syllable units in the voice samples, in this case between "twenty" and "one", being known. The voice samples 203 are used in a dynamic pattern comparison 204 for determining from the utterance 201 to be segmented between the word boundaries 206 where the separation between the syllable units "twenty" and "one" is located.

Block 205 shows a number of possible courses 207, 208 and 209 between the syllable units "twenty" and "one". Suitable averaging, particularly determination of the median, results in the boundary 208 as a suitable subdivision of the syllable units. During the dynamic pattern comparison 204, the word boundaries of the utterance 206 to be segmented are mapped onto the respective word boundaries of the representatives of the reference model 203, that is to say are stretched or compressed. This makes it possible to correlate the known subdivisions of the syllable units in the reference model since the word boundaries are now normalized to the same time interval.

An alternative relates to performing the segmenting by an HMM (Hidden Markov Model) algorithm. The high-performance HMM models use a very large amount of computing time and need a large amount of main memory. The HMMs are based on a statistical database which, in particular, comprises the probability of the transitions of syllable units. Porting to syllable units newly to be combined is extremely complex.

In contrast, the method described in FIG. 2 uses resources much more sparingly than segmenting by HMMs. Using the reference model described which, in particular, comprises six references from six different speakers (three male and three female speakers), in which the syllable unit boundaries needed are known, provides six different subdivisions (indicated by the three lines 207, 208 and 209) which are allocated to the six syllable boundaries or syllable unit boundaries, respectively, of the reference model.

Another advantage relates to porting into another language does not need a complete database for word segmenting but manages with only the abovementioned six reference models (speakers).

Figure 3:
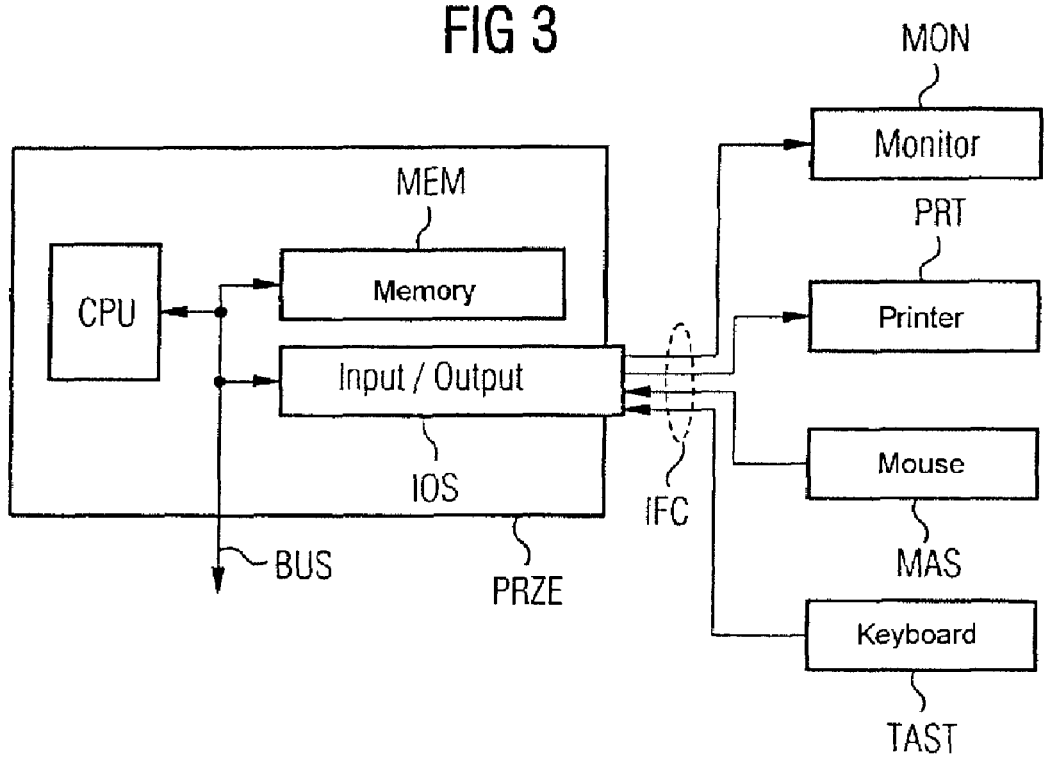
FIG. 3 shows a processor unit.

FIG. 3 shows a processor unit PRZE. The processor unit PRZE comprises a processor CPU, a memory MEM and an input/output interface IOS which is used in different ways via an interface IFC: an output becomes visible on a monitor MON and/or is output on a printer PRT via a graphical user interface. Input is effected either with a mouse MAS or a keyboard TAST. The processor unit PRZE also has a data bus BUS which ensures a connection between a memory MEM, the processor CPU and the input/output interface IOS. Furthermore, additional components such as, for example, an additional memory, data store (hard disk) or scanner can be connected to the data bus BUS.

The invention claimed is:

1. A method for verifying a speaker by a computer, comprising:
   randomly selecting a code word by assembling previously stored syllable units, the syllable units having been previously supplied by the speaker;
   allowing a speaker to utter a code word, the code word having at least two syllable units with at least one syllable unit being a component of another code word;
   comparing the code word uttered by the speaker with a pattern formed of previously stored syllable units having been previously supplied by the speaker; and
   verifying the speaker only if the pattern matches the uttered code word with a predetermined minimum quality.

2. The method as claimed in claim 1, further comprising: requesting the speaker to utter the code word, and displaying to the speaker the code word to be uttered.

3. The method as claimed in claim 1, wherein the speaker is only authenticated when he has uttered a number of code words in each case with sufficient minimum quality.

4. The method as claimed in claim 1, wherein each syllable unit comprises at least one number.

5. The method as claimed in claim 1, wherein the pattern comprises two-digit numbers.

6. The method as claimed in claim 1, wherein the pattern comprises two-digit numbers within a range from 21 to 99.

7. The method as claimed in claim 2, wherein the speaker is only authenticated when he has uttered a number of code words in each case with sufficient minimum quality.

8. The method as claimed in claim 7, wherein each syllable unit comprises at least one number.

9. The method as claimed in claim 8, wherein the pattern comprises two-digit numbers.

10. The method as claimed in claim 9, wherein the pattern comprises two-digit numbers within a range from 21 to 99.

11. A method for verifying a speaker, comprising:
    assembling a new code word from syllable units;
    allowing the speaker to utter the code word;
    comparing the code word uttered by the speaker with at least one pattern, formed of previously stored syllable units, the syllable units having been previously supplied by the speaker; and
    verifying the speaker only if the at least one pattern matches the uttered code word with a predetermined minimum quality
    wherein the code word is randomly selected by assembling the previously stored syllable units having been previously supplied by the speaker.

12. The method as claimed in claim 11, further comprising:
    requesting the speaker to utter the code word, and
    displaying to the speaker the code word to be uttered to the speaker.

13. The method as claimed in claim 11, wherein the speaker is only authenticated when he has uttered a number of code words in each case with sufficient minimum quality.

14. The method as claimed in claim 11, wherein each syllable unit comprises at least one number.

15. The method as claimed in claim 11, wherein the pattern comprises two-digit numbers.

16. The method as claimed in claim 11, wherein the pattern comprises two-digit numbers within a range from 21 to 99.

17. The method as claimed in claim 12, wherein the speaker is only authenticated when he has uttered a number of code words in each case with sufficient minimum quality.

18. The method as claimed in claim 17, wherein each syllable unit comprises at least one number.

19. The method as claimed in claim 18, wherein the pattern comprises two-digit numbers.

20. The method as claimed in claim 19, wherein the pattern comprises two-digit numbers within a range from 21 to 99.

21. A method for training patterns for verifying a speaker, comprising:
    allowing the speaker to speak a plurality of words;
    automatically segmenting the words into syllable units;
    storing the syllable units;
    randomly selecting a code word by assembling the syllable units having been previously supplied by the speaker to form the code word; and
    using the code word, including the syllable units having been previously supplied by the speaker, to verify the speaker.

22. The method as claimed in claim 21, wherein the words used to verify the speaker is a pattern assembled from the segmented syllable units.

23. The method as claimed in claim 21, wherein the words are automatically segmented into syllable units by a DTW algorithm.

24. The method as claimed in claim 21, wherein the words are automatically segmented using a plurality of predetermined voice samples.

25. The method as claimed in claim 21, wherein voice samples for a particular speaker replace predetermined generic voice samples.

26. The method as claimed in claim 22, wherein the words are automatically segmented into syllable units by a DTW algorithm.

27. The method as claimed in claim 26, wherein the words are automatically segmented using a plurality of predetermined voice samples.

28. The method as claimed in claim 27, wherein voice samples for a particular speaker replace predetermined generic voice samples.

29. A computer readable medium storing a program for controlling a computer to perform a method comprising:

allowing a speaker to utter at least one code word, the code word having at least two syllable units with at least one syllable unit being a component of another code word;

comparing the code word uttered by the speaker with at least one pattern formed of previously stored syllable units, the syllable units having been previously supplied by the speaker; and verifying the speaker only if the at least one pattern matches the uttered code word with a predetermined minimum quality, wherein the code word is randomly selected by assembling the previously stored syllable units having been previously supplied by the speaker.

* * * * *